Nov. 24, 1959 M. C. BRANCH 2,914,667

PULSE TRANSMITTING CIRCUIT

Filed July 3, 1953 3 Sheets-Sheet 1

Inventor
M. C. BRANCH
By R. P. Morris
Attorney

Nov. 24, 1959 M. C. BRANCH 2,914,667

PULSE TRANSMITTING CIRCUIT

Filed July 3, 1953 3 Sheets-Sheet 2

Inventor
M. C. BRANCH
By R.P. Morris
Attorney

Inventor
M. C. BRANCH
By R P Morris
Attorney

United States Patent Office 2,914,667

Patented Nov. 24, 1959

2,914,667

PULSE TRANSMITTING CIRCUIT

Maurice Charles Branch, London, England, assignor to International Standard Electric Corporation, New York, N.Y., a corporation of Delaware Application July 3, 1953, Serial No. 366,015

Claims priority, application Great Britain July 7, 1952

17 Claims. (Cl. 250—27)

The present invention relates to electrical circuits, and more especially to such circuits using electrical gate circuits, an electrical circuit for generating a pulse train under the control of a number register, which circuit comprises an electrical gate circuit through which pulses may be passed to an output circuit, means responsive to said register being set to any one of a number of predetermined conditions to open said gate circuit, means responsive to each pulse being passed through said gate circuit to said output connection to alter the conditions of said register, and means for closing said gate circuit when said register is not set to one of said predetermined conditions, whereby a pulse train is generated which bears a predetermined relation to the initial condition of said register.

Another feature of the present invention comprises an electrical circuit for generating a pulse train consisting of any number of pulses from 1 to 10 (10 pulses representing the digit 0) under control of an electrical binary register, in which said register is initially set to store the complement with respect to 15 (i.e. $2^4-1$) of the number of pulses in the train to be generated, which circuit comprises an electrical gate circuit to which pulses may be applied, a plurality of control circuits between said register and said gate circuit, in which said control circuits are so arranged that when the number stored in said register is any desired one or more of 5 to 14 (i.e. the complement with respect to 15 of any number from 10 to 1) inclusive, a pulse applied to said gate circuit passes therethrough to an output connection, means responsive to a pulse passing through said gate circuit to said output connection to increase the number stored in said register by 1, and means for causing said control connections to close said gate circuit when said register is set to store a number other than a number between 5 and 14, whereby a pulse train is generated which consists of a number of pulses equal to the complement with respect to 15 of the number initially stored in said register.

The invention will now be described with reference to the accompanying drawings, in which.

The arrangement shown employs coincidence gate circuits of the type using metal rectifiers, although other forms of gate circuits could be used.

When a number is stored in a register it is often desirable to be able to use the number stored in the register to control the transmission of a train of pulses. The number of pulses in that train bears a predetermined relation to the number stored in the register, and as each pulse of the train is emitted it subtracts one from the stored total, so that when the pulse train ends the register has been cleared.

Figure 1:
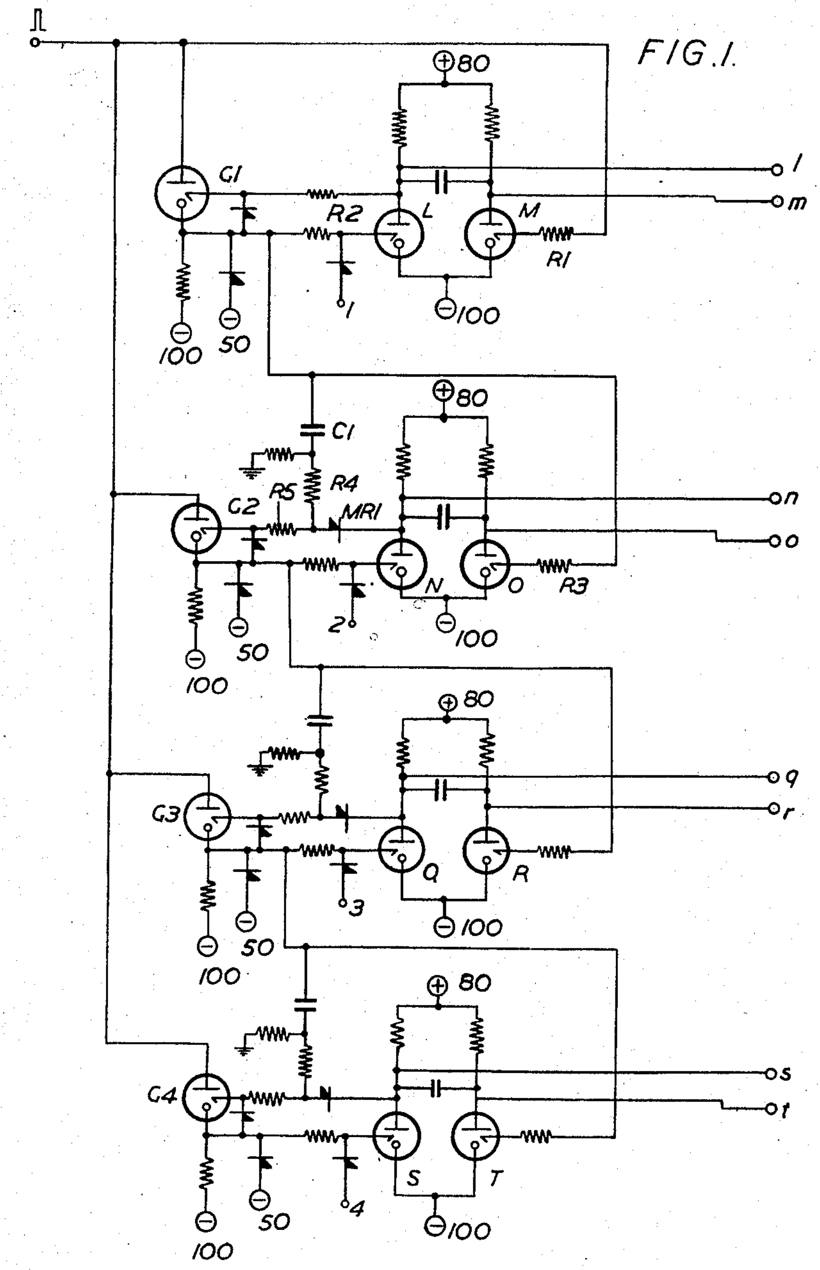
Fig. 1 is an electronic binary counter.

A typical application of the invention is to control a train of pulses representing a dialled digit under control of the number stored in a binary counter, such as that of Fig. 1. This counter is fully described and claimed in the application, Serial No. 349,026, filed April 15, 1953, and now abandoned.

Pulses for operating the counter are applied at the upper left corner of the figure. Each stage of the counter is a flip-flop circuit of the "either-side-stable" type. If one tube of a pair is discharging and the other tube is fired, then the first tube is extinguished. Associated with each stage there is a gating tube.

In the normal condition, tubes L, N, Q, and S are discharging. When one of these tubes is discharging, its anode voltage is at or near —30 volts, so in the initial condition none of the gate tubes G1 to G4 can fire. Thus the first pulse, though applied to all stages of the counter, is only effective on tube M, via R1, so M fires and extinguishes L.

When the next pulse arrives, it finds L quiescent, so the trigger electrode of G1 is at a positive potential. Hence the pulse fires G1. The positive cathode output pulse from G1 is applied to L via R2, and fires L and extinguishes M, and is applied to the next stage of the counter. As N is discharging its anode voltage is low, so rectifier MR1 is not biassed positive, and the pulse from G1 therefore has no effect on G2. This pulse is, however, applied to tube O via resistance R3 and O therefore fires and extinguishes N. Thus we now have L and O (and of course S and Q) discharging.

The next, i.e. the third, pulse finds L discharging, so is only effective on M. Thus we now have O and M (and S and Q) discharging.

The fourth pulse finds L quiescent, so G1 is fired and it fires L, which extinguishes M. The output pulse of G1 is applied to the next stage and is applied via C1, R4 and R5 to the trigger electrode of tube G2. N is quiescent, so MR1 is biassed positive, and therefore G2 fires. The cathode output pulse from G2 fires tube N, extinguishing tube O, and is applied to the next stage. Thus it fires tube R, which extinguishes tube Q. Thus we now have R, N and L (and S) discharging. As the gate tubes have no anode supply other than the drive pulses, they cannot continue to discharge when there is no pulse present.

Output leads *l, m, n, o, q, r, s, t* are connected respectively to the anodes L, M, N, O, Q, R, S, and T. For a more complete description of the operation of this circuit attention is directed to the application noted above.

In the present arrangement it is assumed that the number stored on the counter by the application of a train of pulses is the complement with respect to 15 of the number of pulses to be sent in the transmitted train. The pulse trains emitted are to have from 1 to 10 pulses, 10 pulses representing the digit 0, as is usual in the telephone exchange art. Thus for these values the counter is set to store 14 to 5 respectively. This is down in Table A, which also shows the states of the tubes.

*Table A*

| Digit Value | Complement | Tubes discharging | Tubes not discharging |
|---|---|---|---|
| 0 | 5 | SRNM | TQOL. |
| 9 | 6 | SROL | TQNM. |
| 8 | 7 | SROM | TQNL. |
| 7 | 8 | TQNL | SROM. |
| 6 | 9 | TQNM | SROL. |
| 5 | 10 | TQOL | SRNM. |
| 4 | 11 | TQOM | SRNL. |
| 3 | 12 | TRNL | SQOM. |
| 2 | 13 | TRNM | SQOL |
| 1 | 14 | TROL | SQNM. |

Table B shows the state of the tubes for stored complementary numbers 15, 0, 1, 2, 3 and 4. These tables will be referred to later during the description.

*Table B*

| Stored number | Tubes discharging | Tubes not discharging |
|---|---|---|
| 15 | TROM | SQNL. |
| 0 | SQNL | TROM. |
| 1 | SQNM | TROL. |
| 2 | SQOL | TRNM. |
| 3 | SQOM | TRNL. |
| 4 | SRNL | TQOM. |

Thus it will be seen that the circuit must only allow pulses to be transmitted if the counter is set at a number from 5 to 14 inclusive. Thus the initial input pulse train to the counter is a pulse train comprising from 14 to 5 pulses, which is applied over the driving pulse lead in a manner not shown. An alternative method of setting the counter is to fire such tubes as should be discharging for the desired number via coincidence gates connected to the trigger electrodes of the tubes.

The output pulse train consists of 10 pulses per second, and each output pulse is also used to control the counter to add 1 to the number stored therein.

Figure 2:
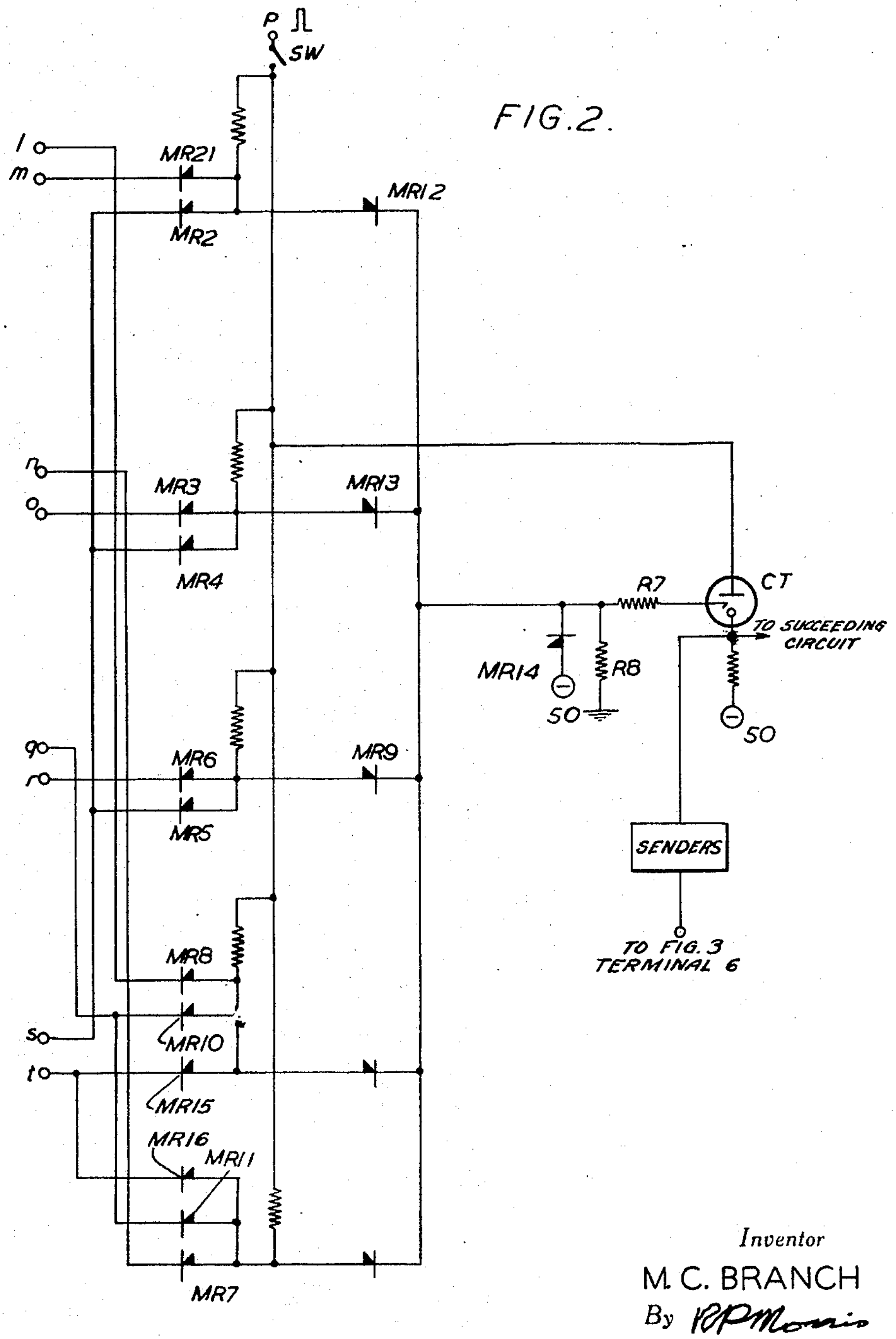
Fig. 2 shows a gating circuit according to the present invention.

The circuit of Fig. 2 supplies the output pulse train and comprises a cold cathode gaseous discharge tube CT to which pulses P at the rate of 10 per second from a source not shown are applied through a switch SW under control of a set of five coincidence-gate circuits. The pulses range from a "no pulse" value of earth to a "pulse" value of 110 volts positive. The gates are connected to terminals *l, m, n, o, q, r, s,* and *t* which are connected to the corresponding terminals of Fig. 1. Reference to Table A will show that if a pulse P matures it is only effective on tube CT if the register is storing a number between 5 and 14. For the purpose of explanation it will be assumed that the register has been initially set to store the number 11. This is the complement of 4, so that pulse train to be emitted comprises four pulses. During the storing process the switch SW is open, preventing the operation of the circuit of Fig. 2.

With the counter set to store 11, tubes T, Q, O and M are discharging and tubes S, R, N and L are quiescent, i.e. not discharging. The tubes which are discharging have their anodes at a low potential (see above), while the tubes which are quiescent have their anodes at the full supply voltage. The rectifiers in Fig. 2 which are inserted in the control connections of the coincidence gates are connected to the anodes of the tubes, as indicated by the lettered terminals on the left-hand side of the drawing. Thus, for example, rectifier MR2 is connected to the anode of tube S, MR3 to the anode of tube O, and so on. It will be noted that tubes L, M, N, O, and R, each has one rectifier connected to its anode, tubes Q and T each has two rectifiers connected to its anode and tube S has three rectifiers connected to its anode.

When the number has been stored, the switch SW of Fig. 2 is closed in a manner not shown and pulses P are delivered to the gate circuits. A pulse P can only be effective on the trigger electrode of CT if all rectifiers controlling any one coincidence gate circuit are simultaneously biassed positive, i.e. if all the tubes controlling that gate circuit are quiescent. In the example assumed, with 11 stored in the counter, tubes S, R, N and L are quiescent, thus biassing rectifiers MR2, MR4, MR6, MR5, MR7 and MR8 positively. It will be seen that one gate circuit, that including rectifiers MR5 and MR6, has all of its controlling rectifiers biassed positive. Therefore, after the switch SW is closed, the first pulse P is applied via a decoupling rectifier MR9 and a resistance R7 to the trigger electrode of CT. The pulse P is also applied to the anode of CT, so CT discharges for the duration of the pulse and emits an output pulse from its cathode circuit. This output pulse is transmitted to the succeeding circuit. R7 is a current limiting resistance.

The output pulse is also used to control the input of the counter of Fig. 1, in a manner to be described, to change its setting to 12, when tubes T, R, N and L are discharging, and S, Q, O, and M are quiescent (see Table A). In this case rectifiers MR2, MR4, MR5, MR10, MR11, MR3, and MR21 are all biassed positively from the anodes of the quiescent tubes. Thus two gates have all their controlling rectifiers biassed positively, the gates consisting of rectifiers MR21 and MR2 and rectifiers MR3 and MR4. Therefore the next P pulse is applied to the trigger electrode of CT via decoupling rectifiers MR12 and MR13 in parallel. Therefore tube CT is fired, and emits an output pulse from its cathode circuit.

As before, the output pulse is also used to control the counter to change its setting to 13, when tubes T, R, N and M are discharging and tubes S, Q, O and L are quiescent. Therefore rectifiers MR2, MR4, MR5, MR10, MR11, MR3, and MR8 are all biassed positively from the anodes of the quiescent tubes. The gate circuit including rectifiers MR3 and MR4 has all of its controlling rectifiers biassed positively. Hence when the next P pulse matures it is applied via MR13 to the trigger electrode of tube CT, which therefore fires and emits an output pulse.

As before, this pulse is used to control the counter to change its setting to 14, when tubes T, R, O and L are discharging with tubes S, Q, N and M quiescent. This means that rectifiers MR2, MR4, MR5, MR10, MR11, MR7 and MR21 are all biassed positively. Therefore the gate including rectifiers MR21 and MR2 has all of its controlling rectifiers biassed positively, so the next P pulse is applied via rectifier MR12 to the trigger circuit at CT. CT therefore fires and emits an output pulse.

This pulse is used to control the counter to change its setting to 15, when tubes T, R, O and M are discharging with tubes S, Q, N and L quiescent. Therefore rectifiers MR2, MR4, MR5, MR10, MR11, MR7 and MR8 are all biassed positively. From an inspection of the coincidence gate circuits in Fig. 2 it will be seen that all of them have at least one controlling rectifier connected to a discharging tube and hence not biassed positive. Hence the next P pulse is not effective on tube CT, and additional P pulses likewise have no effect.

Thus with 11 set in the counter, a train of four pulses has been transmitted from the cathode of tube CT. If it is desired to use the counter to time the interdigital pause, the pulses stepping it are still applied to the counter in the following manner. In this case it is preferable to use two sources of pulses, but producing 10 pulses per second but the pulses from the second source being displaced by 50 milliseconds, i.e. half a pulse period, with respect to the first pulses. The second pulse source designated X, then supplies the pulses to step the counter by means of the circuit of Figure 3. Pulse application to the counter is initiated in response to the first pulse emitted by tube CT, and is stopped when the counter is set to store 4.

Figure 3:
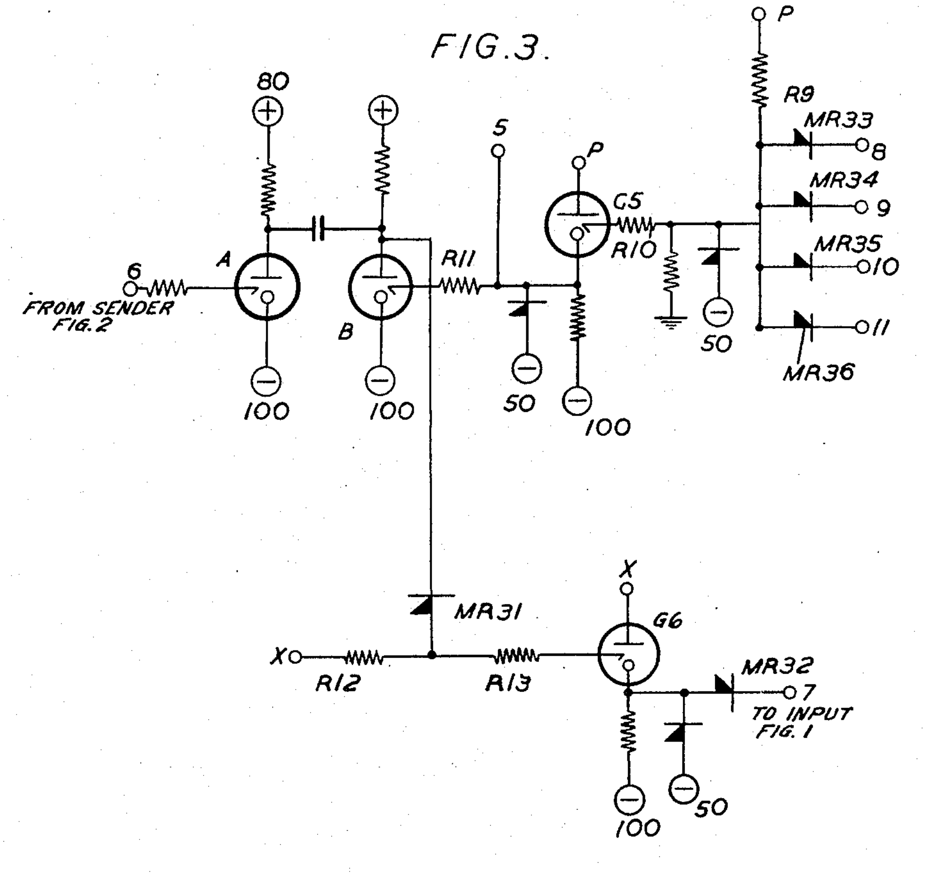
Fig. 3 shows associated control circuits.
Figure 4:
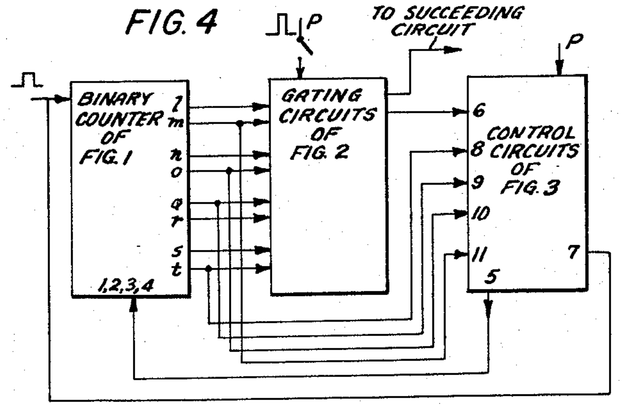
Fig. 4 is a block diagram of the entire circuit.

In Fig. 3 tubes A and B constitute a flip-flop circuit which stays in one condition until acted upon by an external pulse. The input terminal 6 of the tube A is connected to the cathode of tube CT of Fig. 2. Initially tube B is discharging, and a reset connection (not shown) may be provided to fire B and set the counter to zero when switching on initially. In normal operations, however, when the counter of Fig. 1 reaches position 4, tubes T, Q, O and M are quiescent, so rectifiers MR33–36 of Fig. 3, connected to the trigger electrode of tube G5, are biassed positively via terminals 8 to 11 which are connected respectively to tubes T, Q, O, and M. Hence the next P pulse is applied via resistors R9 and R10 to the trigger electrode of gate tube G5.

The anode supply of G5 is also the P pulse source, so tube G5 fires and continues to discharge for the duration of the P pulse. The cathode output pulse from G5 is applied to the trigger electrode of tube B via resistor R11. Therefore B fires and extinguishes A. The cathode output pulse from G5 is also applied via terminal 5 to terminals 1, 2, 3, 4 of the left-hand counter tubes L, N, Q, and S, in Fig. 1, which thereupon fire, resetting the counter to zero.

When the number is inserted in the counter, the counter, as already described, causes CT to pass P pulses. The input circuit of tube A of Fig. 3 is connected via terminal 6 to the cathode of CT (Fig. 2). Hence the first P pulse passed by CT causes A to fire and to extinguish B. With B quiescent, its anode voltage becomes positive and biasses rectifier MR31 positively, so that gate tube G6 can now respond to the X pulses. This tube has X pulses applied to its anode and via resistors R12 and R13 to its trigger electrode. Hence when B is quiescent, G6 can pass X pulses. The cathode circuit of tube G6 is connected via terminal 7 to the drive pulse input lead of Fig. 1 and supplies the pulse which causes the counter to advance a step for each pulse. If the number is inserted by an applied pulse train over the same lead, this output connection includes decoupling rectifier MR32. However MR32 is not needed if the number is inserted in the counter by "marking in."

Tube A continues to discharge, with B quiescent enabling tube G6 to pass X pulses after tube CT has stopped transmitting pulses until the number stored in the counter is 4. When this occurs (see above), MR33 to MR36 are all biassed positive, so the next P pulse fires G5, which fires B, disabling G6, and resets the counter to 0.

For the counter to reach the condition in which it stores 4, it is necessary for it to receive from the X pulse source five additional pulses after CT stopped emitting pulses.

For transmissions of pulses in the case assumed, when CT fires, it operates a sender tube represented by the rectangle in Fig. 2, which, in response to a triggering pulse, discharges, and continues to discharge for 66 milliseconds. This can be achieved in many well-known ways, such as by using a "single-kick" flip-flop, i.e. one having only one stable condition. The sender tube would then operate a sending relay during its conduction period.

The counter reaches position 4 as a result of five impulses from the X pulse source after CT last fired, i.e. 550 milliseconds after CT last fired. The next P pulse occurs 50 milliseconds later, and as the pulse sent by the sender tube was 66 milliseconds long, this means that this P pulse occurs 534 milliseconds after the end of the sender pulse initiated by the last P pulse.

The X pulse supply to the counter is stopped on the fifth additional pulse from the source, as described above, and the P pulse referred to restores the counter to zero (S, Q, N, L discharging). The restoring operation is then used to open switch SW of Fig. 2 to disable the tube CT.

The next digit may then be set up in the counter. In fact, the restoring operation may serve to indicate that the next digit may be marked in, in well-known manner.

The result of the additional counter steps, so produced, is that the next P pulse finds the counter set for the next digit. Thus we have produced an interdigital pause of 534+100=634 milliseconds.

It will be noted that in the type of circuit shown, the controlling rectifiers could equally be connected to the counter tube cathodes if the potentials used were suitable. In that case, of course, the rectifiers would not be allocated to the tubes as shown in the figure.

The trigger electrode of CT is connected to earth via resistances R7 and R8 in series, so that any capacitances associated therewith are discharged between pulses. The trigger electrode circuit is also connected via a rectifier MR14 to −50 volts. This serves to swamp any negative going pulses from the counter which break through the gate rectifiers.

While the principles of the invention have been described above in connection with specific embodiments, and particular modifications thereof, it is to be clearly understood that this description is made only by way of example and not as a limitation on the scope of the invention.

What I claim is:

1. An electrical circuit for generating a pulse train comprising pulse generating means, an operating circuit for said pulse generating means including gating means, said pulse generating means adapted to generate a succession of pulses at a predetermined repetition rate when said gating means is open, registering means for registering any number within a predetermined range of numbers, means connecting said registering means with said gating means for opening said gating means when any one of a certain group of predetermined numbers within said range has been registered in said registering means and closing said gating means when any other number within said range has been registered therein; means connected to said pulse generating means and controlled thereby for altering the condition of said registering means to register another number each time a pulse is generated by said pulse generating means, an output circuit, and means for producing an output pulse in said output circuit each time said registering means is altered to register another number within said certain group of predetermined numbers.

2. An electrical circuit, as defined in claim 1, in which the gating means comprises a plurality of gates arranged in groups and a control circuit between each group of gates and the pulse generating means, and in which the registering means comprises a plurality of registering elements and the means for opening and closing said gating means comprises means for connecting different combinations of said elements with said gates and for opening the gates of a group only when all the elements of said registering means connected thereto are in a predetermined condition.

3. An electrical circuit, as defined in claim 2, in which the registering means is adapted to register any number from 1 to a predetermined number in excess of 10, and the certain group of numbers, any one of which will cause the opening means for the gating means to open said gating means comprises numbers which are complements with respect to the highest number which can be registered, and the means for altering the condition of the register is adapted to change the number registered to the next highest number, whereby the pulse generating means may be made to generate pulses from 1 to 10 when the complementary number has been registered.

4. An electrical circuit, as defined in claim 1, in which the registering means is adapted to register any number from 1 to a predetermined number in excess of 10, and the certain group of numbers, any one of which will cause the opening means for the gating means to open said gating means comprises numbers which are complements with respect to the highest number which can be registered, and the means for altering the condition of the register is adapted to change the number registered to the next highest number, whereby the pulse generating means may be made to generate pulses from 1 to 10 when the complementary number has been registered.

5. An electrical circuit, as defined in claim 4, in which the gating means comprises a plurality of coincidence detecting circuits and a control circuit between each coincidence detecting circuit and the pulse generating means, and in which the registering means comprises a plurality of registering elements and the means for opening and closing said gating means comprises means for connecting a different combination of said elements with each said coincidence detecting circuit and for operating a coincidence detecting circuit only when all the elements of said registering means connected thereto are in a predetermined condition caused by a particular number being registered.

6. An electrical circuit, as defined in claim 5, in which the control circuits are parallelly connected in the operating circuit for the pulse generating means and said operating circuit comprises means for delivering operating pulses at a predetermined rate through any operated coincidence detecting circuit and the associated control circuit to said pulse generating means, each of said coincidence detecting circuits having a resistance connected in series therewith between it and said operating pulses delivering means and each coincidence detecting circuit comprising a plurality of rectifiers connected to said resistance and poled so as to permit current to flow during the period of said operating pulse through said resistance and any of said rectifiers which are not biassed, and in which each element in the registering means, is adapted to supply a bias to any rectifiers connected thereto when said element is in the predetermined condition caused by a particular number being registered.

7. An electrical circuit, as defined in claim 6, further comprising decoupling means in each control circuit for preventing the operation of the associated coincidence detecting circuit from affecting any other coincidence detecting circuit.

8. An electrical circuit, as defined in claim 7, in which the registering means comprises a multi-stage binary counter having a pair of tubes per stage, each of said tubes being a registering element, means for registering a number in said register by operating a combination of said tubes, and means for biasing a rectifier connected to a tube by a predetermined condition thereof.

9. An electrical circuit, as defined in claim 8, in which the rectifiers are connected to the anodes of the tubes and are therefore biassed when the tubes are non-conductive.

10. An electrical circuit, as defined in claim 1, in which the pulse generating means comprises a cold cathode gaseous discharge tube having an anode, a cathode, a trigger electrode, and a cathode circuit including a resistor, and in which the operating circuit comprises means for delivering pulses at a predetermined rate to said anode as the sole anode potential of said tube, means for delivering pulses at said same rate to said trigger electrode through the gating means, whereby said tube will operate when pulses simultaneously reach said anode and trigger electrode, and an output circuit connected across said resistor for utilizing the generated pulse.

11. An electrical circuit, as defined in claim 10, in which the means connecting the registering means with the gating means comprises a pulse sender circuit connected to the output circuit and adapted to transmit a pulse having a slightly longer time duration than the pulse produced by the pulse generating tube, and means controlled by a pulse transmitted by said pulse sender circuit for transmitting to said registering means a pulse delayed in time with respect to the pulse produced by said output circuit for causing the next higher number to be registered therein.

12. An electrical circuit, as defined in claim 11, in which the means for transmitting a delayed pulse to the registering means comprises a gate circuit, means for applying pulses at the same rate as the pulses generated by said pulse generating means but delayed in time to said gate circuit, means for normally holding said gate circuit closed, whereby said delayed pulses cannot pass therethrough, means operated by the first pulse received from the pulse sender circuit for opening said gate circuit, whereby said delayed pulses may pass therethrough, and means connected to said registering means for closing said gate circuit when a predetermined number has been registered in said registering means, whereby an inter-train pause has been produced under control of said registering means.

13. An electrical circuit, as defined in claim 1, in which the gating means comprises a group of coincidence detecting circuits each of which, when operated, being adapted to open said gating means and a control circuit between each coincidence detecting circuit and the pulse generating means, and in which the registering means comprises a plurality of registering elements, and the means for opening and closing said gating means comprises means for connecting different combinations of said registering elements to each of said coincidence detecting circuits and for operating a coincidence detecting circuit to open said gating means only when all the elements of said registering means connected to said coincidence detecting circuit are in a predetermined condition.

14. An electrical circuit, as defined in claim 13, in which the control circuits are parallely connected in the operating circuit for the pulse generating means and said operating circuit comprises means for delivering operating pulses at a predetermined rate through any operated coincidence detecting circuit and the associated control circuit to said pulse generating means, each of said coincidence detecting circuits having a resistance connected in series therewith between it and said operating pulse delivering means, and each coincidence detecting circuit comprising a plurality of rectifiers connected to said resistance and poled so as to permit current to flow during the period of said operating pulse through said resistance and any of said rectifiers which are not biassed, and in which each element in the registering means is adapted to supply a bias to any rectifiers connected thereto when said element is in the predetermined condition caused by a particular number being registered.

15. An electrical circuit, as defined in claim 13, further comprising a decoupling means in each control circuit for preventing the operation of the associated coincidence detecting circuit from affecting any other coincidence detecting circuit.

16. An electrical circuit, as defined in claim 1, in which the registering means comprises a multi-stage counter having a pair of tubes per stage, means for registering any number in said register by operating a combination of said tubes, and means determined by the combination of tubes operated for opening or closing the gating means, and in which the means for altering the condition of said registering means to register another number changes the combination of tubes operated to indicate the next higher number.

17. An electrical circuit, as defined in claim 1, in which the means for altering the condition of the registering means comprises a gate circuit, means for applying pulses at the same rate as the pulses generated by the pulse generating means but delayed in time to said gate circuit, means for normally holding said gate circuit closed, whereby said delayed pulses cannot pass therethrough, means operated by the first pulse received from said pulse generating means for opening said gate circuit, whereby said delayed pulses may pass therethrough, and means connected to said registering means for closing said gate circuit when a predetermined number has been registered in said registering means, whereby an inter-train pause has been produced under control of said registering means.

(References on following page)

References Cited in the file of this patent

UNITED STATES PATENTS

| | | |
|---|---|---|
| 2,418,521 | Morton et al. | Apr. 8, 1947 |
| 2,489,325 | Ridler | Nov. 29, 1949 |
| 2,557,729 | Eckert | June 19, 1951 |
| 2,567,944 | Krause et al. | Sept. 18, 1951 |
| 2,574,283 | Potter | Nov. 6, 1951 |
| 2,609,143 | Stibitz | Sept. 2, 1952 |
| 2,623,171 | Woods-Hill et al. | Dec. 23, 1952 |
| 2,674,726 | Spielberg | Apr. 6, 1954 |
| 2,690,507 | Woods-Hill et al. | Sept. 28, 1954 |

FOREIGN PATENTS

| | | |
|---|---|---|
| 596,670 | Great Britain | Jan. 6, 1948 |

OTHER REFERENCES

Pro. IRE, January 1952, vol. 40, No. 1, pp. 29–33, "Logical Description of Some Digital-Computer Adders and Counters," by Gray.